(12) United States Patent
Chigurupati

(10) Patent No.: US 7,989,016 B2
(45) Date of Patent: Aug. 2, 2011

(54) METHOD FOR PRODUCING A LOW SODIUM SALT COMPOSITION

(76) Inventor: Sambasiva Rao Chigurupati, Omaha, NE (US)

( * ) Notice: Subject to any disclaimer, the term of this patent is extended or adjusted under 35 U.S.C. 154(b) by 455 days.

(21) Appl. No.: 11/539,129

(22) Filed: Oct. 5, 2006

(65) Prior Publication Data

US 2008/0085360 A1 Apr. 10, 2008

(51) Int. Cl.
*A23L 1/059* (2006.01)
(52) U.S. Cl. .......... 426/649; 426/573; 423/179
(58) Field of Classification Search .......... 426/649, 426/578; 423/179
See application file for complete search history.

(56) References Cited

U.S. PATENT DOCUMENTS

| | | | |
|---|---|---|---|
| 4,068,006 A * | 1/1978 | Moritz | 426/97 |
| 4,556,566 A | 12/1985 | Bell | |
| 4,556,567 A | 12/1985 | Meyer | |
| 4,556,568 A | 12/1985 | Meyer | |
| 5,064,663 A | 11/1991 | Murray et al. | |
| 5,094,862 A | 3/1992 | Bunick et al. | |
| 5,494,689 A * | 2/1996 | Lee et al. | 426/97 |
| 5,853,792 A * | 12/1998 | Zolotov et al. | 426/649 |
| 6,090,419 A | 7/2000 | Popplewell et al. | |
| 6,743,461 B1 | 6/2004 | Vasquez | |
| 2003/0175202 A1 * | 9/2003 | Mao | 423/499.4 |

OTHER PUBLICATIONS

Understandingfoodadditives.org, 'Anti-Caking Agents', archive.org date Aug. 25, 2006.*
NPL 2—'Rosemary Extract', Archive.org date Sep. 28, 2004.*
Akerboom, CA1147653, Derwent Abstract, 1983.*
Notification of Transmittal of the International Search Report and the Written Opinion of the International Search Authority, application No. PCT/US07/80510, filed Oct. 5, 2007.
Communication from the European Patent Office dated Jan. 25, 2010, regarding the extended European search report for European Patent Application No. 07853780.0, Applicant Rao, Chigurupati Sambasiva.

* cited by examiner

*Primary Examiner* — Helen F Heggestad
(74) *Attorney, Agent, or Firm* — Polsinelli Shughart PC

(57) ABSTRACT

The present invention relates to a low sodium salt composition and the method used to make it. More particularly, the invention relates to a two step method of making a salt composition. The first step includes contacting a chloride salt with a modifier to form a chloride salt product, mixing the product with a carrier to form a modified chloride salt solution, and spray drying the modified chloride salt solution. The second step includes contacting the dried modified chloride salt with sodium chloride, and grinding the mixture to form a salt composition. The composition includes a combination of sodium chloride and carrier modified chloride salt.

17 Claims, 5 Drawing Sheets

METHOD FOR PRODUCING A LOW SODIUM SALT COMPOSITION

FIELD OF THE INVENTION

The present invention relates to a low sodium salt composition and the method used to make it. More particularly, the invention relates to a two step method of making a salt composition. The first step includes contacting a chloride salt with a modifier to form a chloride salt product, mixing the product with a carrier to form a modified chloride salt solution, and spray drying the modified chloride salt solution. The second step includes contacting the dried modified chloride salt with sodium chloride, and grinding the mixture to form a salt composition. The composition includes a combination of sodium chloride and carrier modified chloride salt.

BACKGROUND OF THE INVENTION

Salt, or sodium chloride (NaCl), is well known. While salt imparts a desirable flavor to food, too much use can result in long term adverse health risks. Because of the proliferation of salt in prepared foods and other products found in a grocery store, many people exceed the average recommended daily intake. Exceeding the recommended daily intake of sodium is a significant risk factor in developing high blood pressure and a cause or contributing factor in the rising incidence of heart disease. As such, medical professionals and governmental authorities recommend a reduction in per capita salt consumption of from about 10 to 12 g per day to a level of about 6 g per day, which is equivalent to 2400 mg of sodium.

The most recent Dietary Guidelines issued in the U.S. suggest a proposed consumption limit of 2400 mg of sodium per day and the National Academy of Science (NAS) even suggests a more stringent limit of 1500 mg of sodium per day. The NAS also recommends a potassium consumption limit of 4,700 mg per day. Typically potassium consumption is less than half of that level.

Because of these and other reasons, there are a variety of salt substitutes in the market. The classical approach to production of salt substitutes involves combining the sodium and potassium salts, or occasionally magnesium salts, in various ratios and adding a wide variety of other additives to this mix. The other additives are generally added to mask or at least partially reduce the generally metallic/bitter taste of potassium that has generally been associated with salt substitutes containing potassium. The processing techniques used to make these products include, among others, simple blending, agglomeration, extrusion cooking, and the like.

Examples of salt substitutes are numerous. One type relates to a salt substitute that includes an inner core of potassium chloride coated with a maltodextrin, an inner core of potassium chloride coated with a mixture of maltodextrin and sodium chloride, and an inner core of potassium chloride coated with a mixture of maltodextrin, sodium chloride, and cream of tarter (potassium bitartrate). The process of making these salt substitutes includes spray-drying onto the potassium chloride a solution of maltodextrin, maltodextrin and sodium chloride, or a mixture of maltodextrin, sodium chloride, and cream of tarter. As can be seen, a complex mixture of potassium chloride product is formed.

The deficiency with these salt substitutes is that the sodium chloride is reacting with the maltodextrin and the potassium chloride. Although the maltodextrin does mask the bitter/metallic flavor of the potassium chloride, the reaction of the three components changes the sodium chloride's "salty flavor" that is desired by the consumer. Accordingly, a need still exists for salt compositions, which have the same taste and appearance to salt, and are easy and inexpensive to make.

SUMMARY OF THE INVENTION

The present invention is directed to a low salt composition that includes a sodium chloride and a carrier modified chloride salt. The carrier modified chloride salt includes a chloride salt, not sodium chloride, and a modifier reacted with a carrier. The carrier is typically a dextrin, or preferably a maltodextrin.

The salt composition is made by a two-step process. The first step includes contacting a chloride salt and a modifier to form a modified chloride salt product. The modified chloride salt product is then mixed with a carrier to form a carrier modified chloride salt solution. The carrier modified chloride salt solution is then spray dried to form a powdered or granular carrier modified chloride salt. The second step includes mixing or blending the carrier modified chloride salt powder or granules with sodium chloride and grinding the dry mixture to produce the salt composition of desired particle size.

DESCRIPTION OF THE PREFERRED EMBODIMENTS

In accordance with the present invention, a process for making a salt composition having the same appearance and taste as salt, while having a reduced sodium content, has been discovered. As used herein, salt, unless modified by another word (i.e. reduced-salt, potassium salt, calcium salt and the like) or used itself to modify another word (i.e. salt substitute, salt composition and the like), means sodium chloride (NaCl).

Related to that process, the resultant salt composition that includes sodium chloride and a powdered or granular carrier modified chloride salt has been discovered. As used herein, a chloride salt may be any single compound such as a chloride of potassium, magnesium, calcium, lithium, ammonium, or a mixture thereof, other than a chloride of sodium. The carrier modified chloride salt includes a mixture of a chloride salt, a modifier, and a carrier. The modifier helps to at least partially dissolve the chloride salt making it easier for it to bind to the carrier. The carrier binds the modified chloride salt and in combination with the modifier reduces the bitterness and off-flavors associated with the chloride salt. In addition, the carrier modified salt has the appearance and taste of salt, i.e. sodium chloride.

The process of making the salt composition of the present invention includes contacting a chloride salt and a modifier to form a modified chloride salt product, mixing the product with a carrier to form a carrier modified chloride salt solution, and then drying the solution to form a powdered or granular carrier modified chloride salt. The process also includes blending the powdered or granular carrier modified chloride salt with sodium chloride to form a dry mixture and grinding the dry mixture to form the salt composition.

The process of making the salt composition ensures that the sodium chloride (NaCl) remain in its natural, unaltered state. By ensuring that the NaCl remain in its natural state, it is believed that the saltiness and flavor associated with NaCl will not be altered. As such, the salt composition of the present invention, that includes both NaCl and the carrier modified chloride salt, has less sodium, but still has the same saltiness, taste, and appearance of a composition that includes only NaCl.

The first step of the process includes forming a powdered or granular carrier modified chloride salt. First, the process includes contacting or mixing a chloride salt and a modifier in an aqueous solution to form a modified chloride salt product. As discussed above the chloride salt may be any compound such as a chloride of potassium, magnesium, calcium, lithium, ammonium, or a mixture thereof, other than sodium. Preferably, the chloride salt is potassium chloride. The modifier may be any compound that increases the relative solubility of the chloride salt, at least partially dissolving it, and lowers the pH of the mixture of chloride salt, modifier, and water. The modifier must also be edible and be of a nature such that the taste of sodium chloride will not be significantly altered by it. The modifier, by itself or in combination with the carrier, masks the bitter or metallic off flavor associated with the chloride salt. Preferably, the modifier is a food grade acidulant. Suitable food grade acidulants include any food grade acids, such as citric acid, tartaric acid, acetic acid, malic acid, fumaric acid, lactic acid, benzoic acid and/or their derivatives, as well as natural sources of such acids, such as lemon juice or the like. Preferably, the food grade acidulant is citric acid.

The process includes mixing from about 60% to about 80% by weight water, from about 15% to about 30% by weight chloride salt, and from about 0.1% to about 3% by weight modifier. Preferably, the process includes mixing about 70% by weight water, 29% by weight potassium chloride, and about 1% by weight citric acid.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

Figure 1:
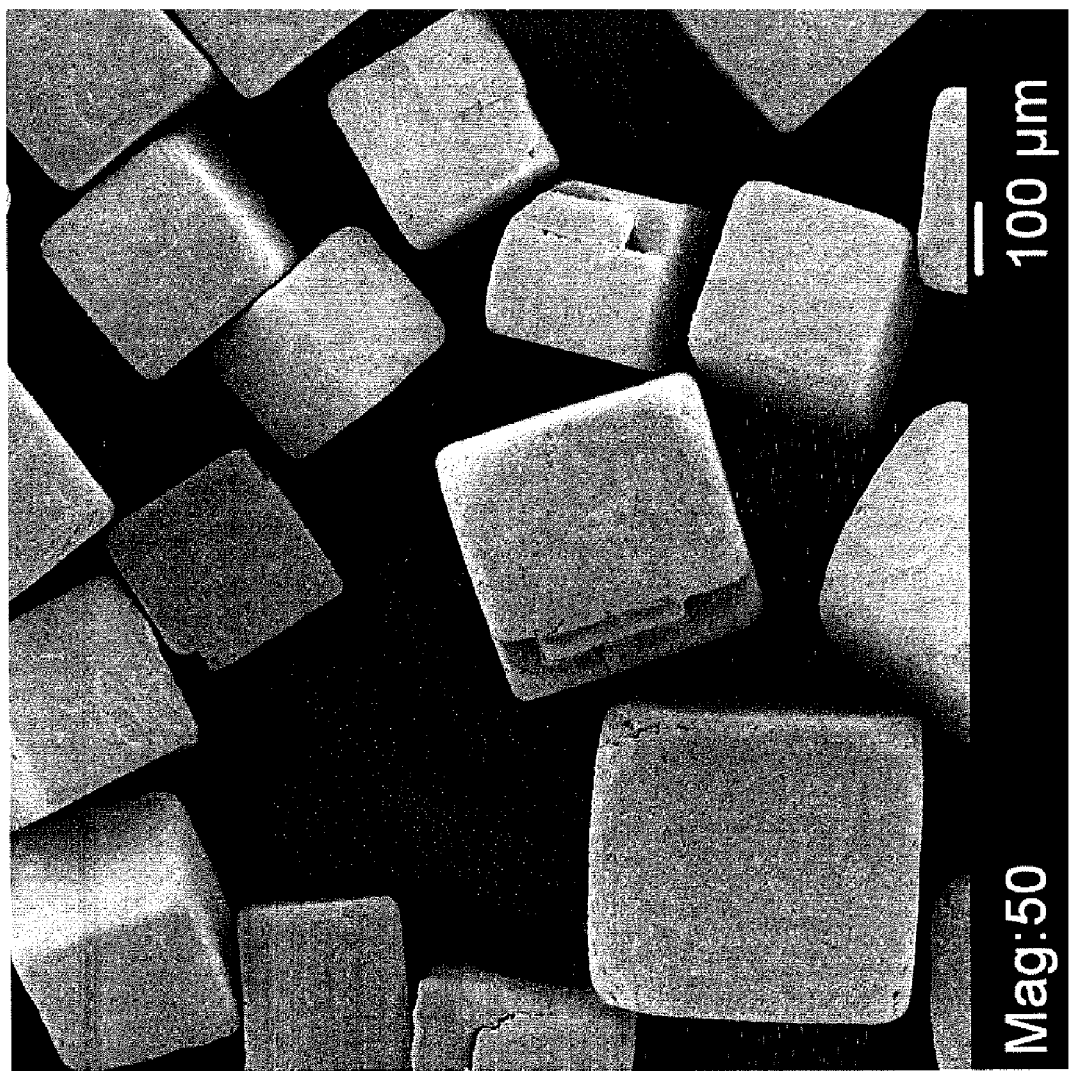
FIG. 1 shows a scanning electron microscopy image for sodium chloride (50× magnification).
Figure 2:
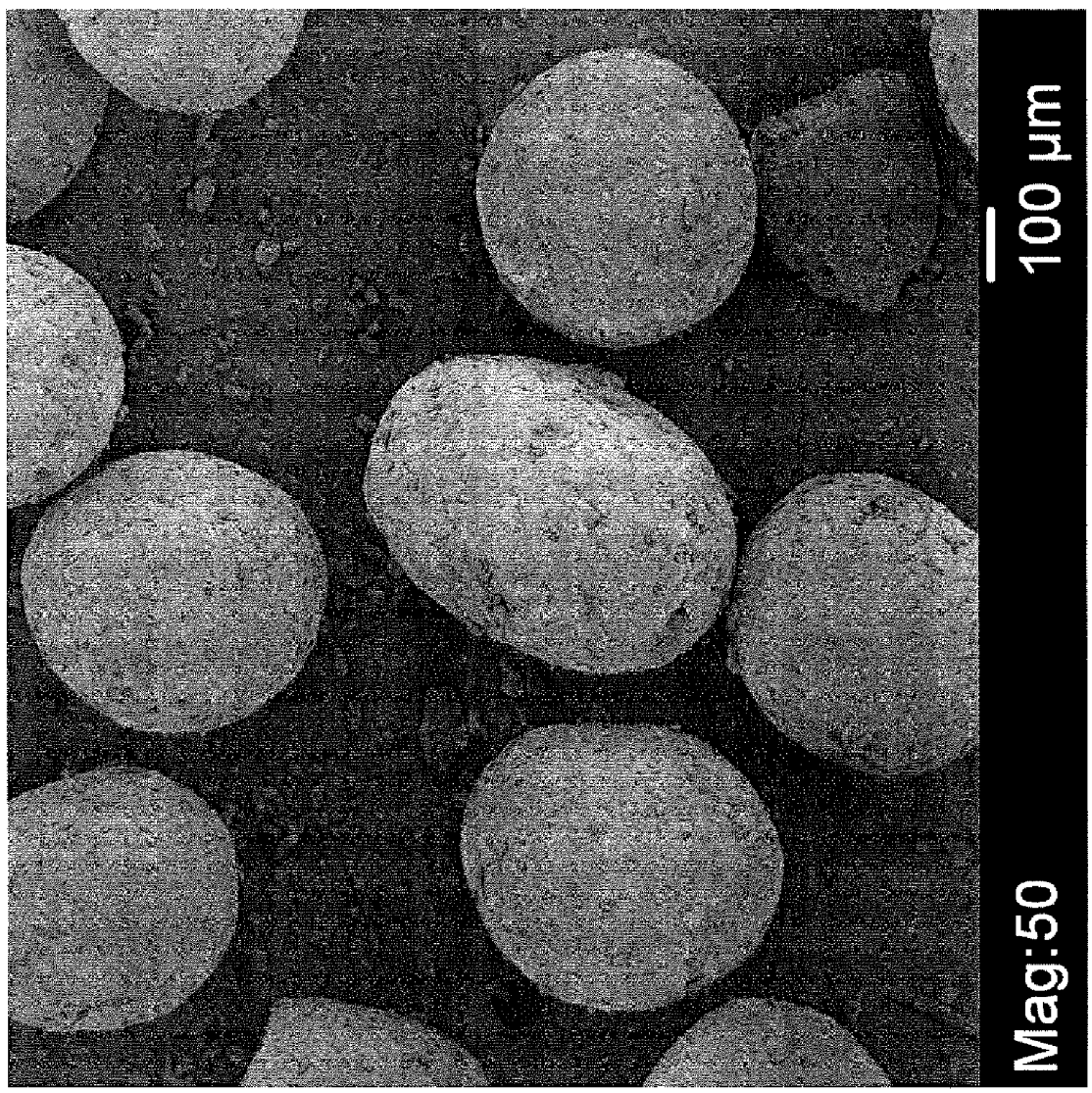
FIG. 2 shows a scanning electron microscopy image for un-modified potassium chloride (50× magnification).
Figure 3:
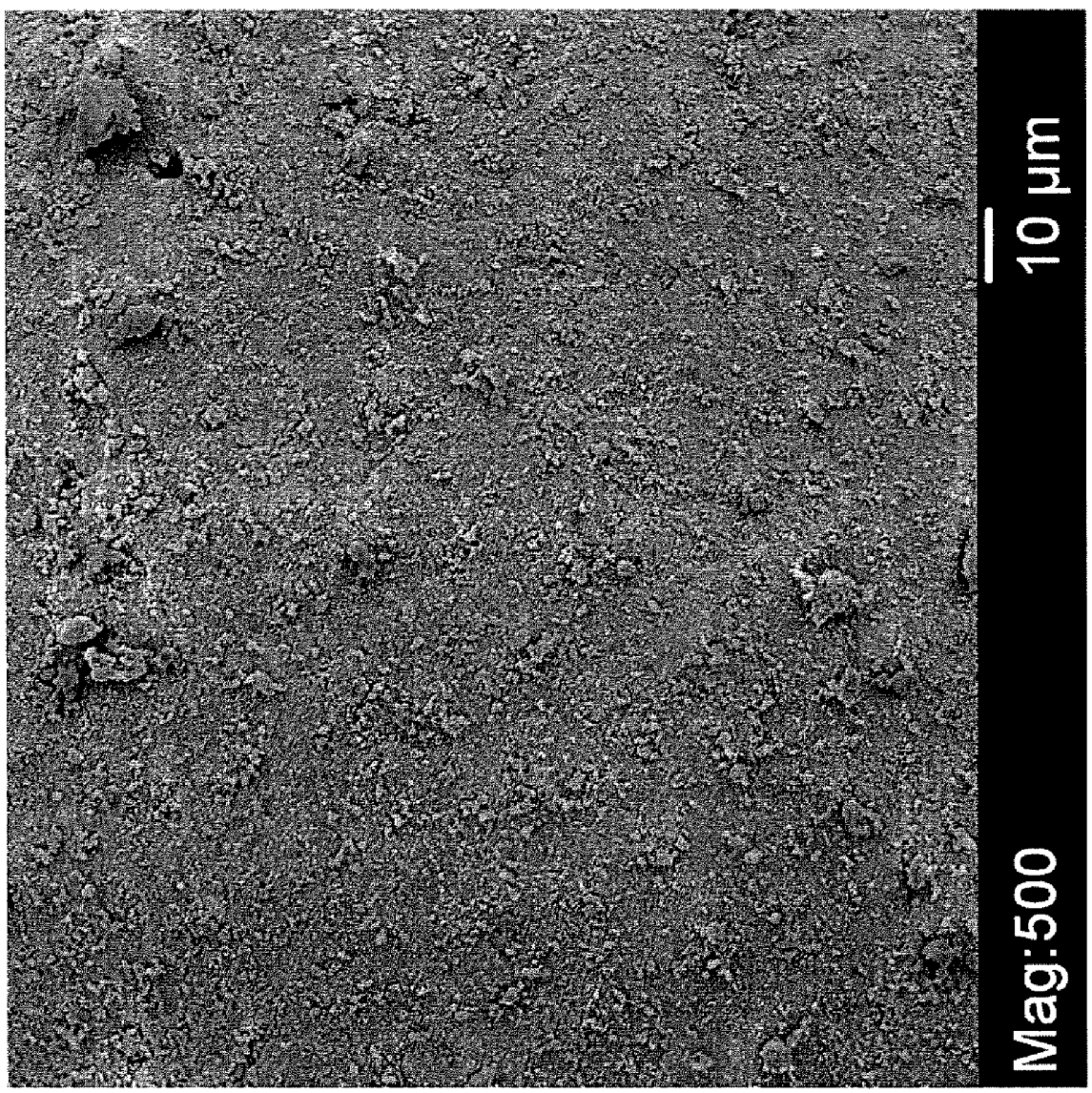
FIG. 3 shows a scanning electron microscopy image for un-modified potassium chloride (500× magnification).
Figure 4:
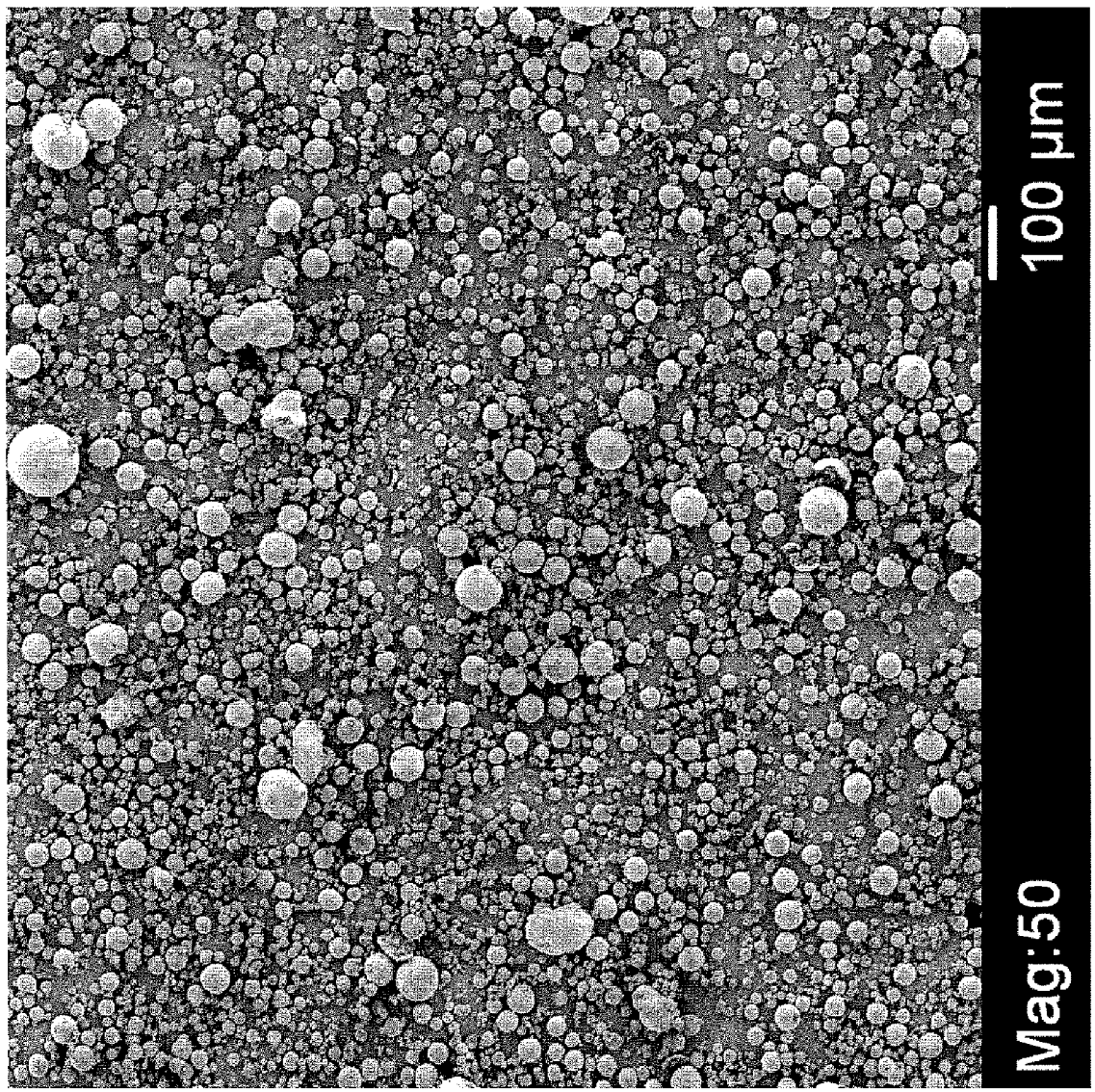
FIG. 4 shows a scanning electron microscopy image for modified potassium chloride (50× magnification).
Figure 5:
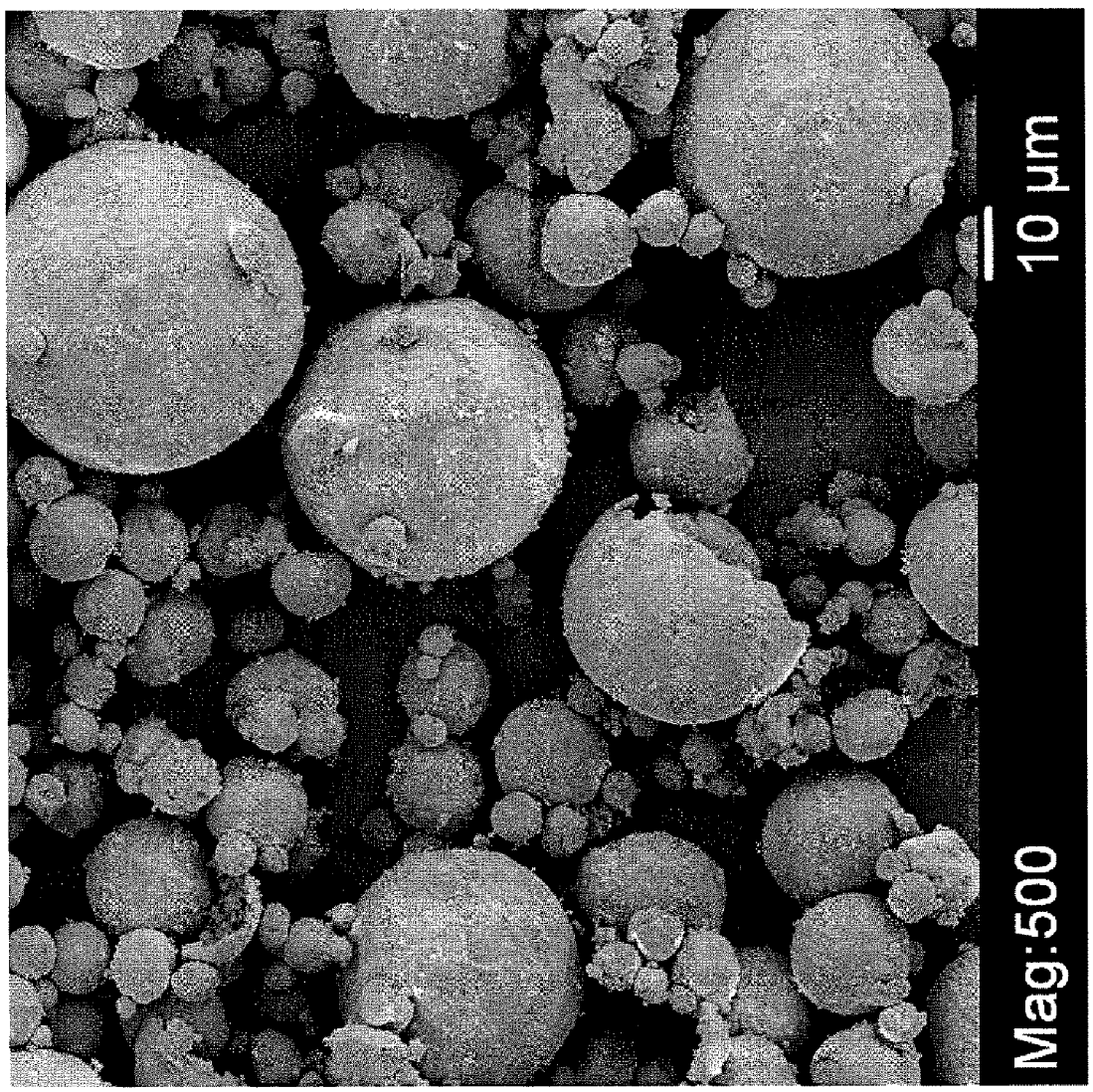
FIG. 5 shows a scanning electron microscopy image for modified potassium chloride (500× magnification).

Typically, the chloride salt, modifier, and aqueous solution is mixed for a time sufficient to thoroughly dissolve the chloride salt. Generally, the chloride salt and modifier are added to a mixing vessel containing water at a temperature of from about 150° F. to about 220° F., preferably about 195° F. The mixing vessel may be any suitable vessel having a means of agitation. Thus, when mixed, a modified chloride salt product is formed.

The modified chloride salt product is then mixed with a carrier, that in combination with the modifier, masks the bitter or metallic off flavor associated with the chloride salt and forms a carrier modified chloride salt solution. In addition, the carrier is selected such that the carrier modified chloride salt has the appearance of salt, i.e. sodium chloride. As such, the carrier may be any short chained starch molecule that reacts with the modified chloride salt to reduce the bitter flavor of the chloride salt and produces a white colored finished product. Suitable carriers include monosaccharides, such as sucrose, glucose, xylose, and ribose, and dextrins, such as maltodextrin and dextrose, among others. Preferably, the carrier is maltodextrin. Suitable maltodextrins have a degree of polymerization of from less than about 10 to less than about 30. The degree of polymerization is the length in monomeric or base units of the average linear polymer chain at time t in a polymerization reaction. The following formula is used to calculate the degree of polymerization:

$$DP = \frac{M_t}{M_0}$$

where
$M_t$=molecular weight at time t
$M_0$=molecular weight of one monomeric unit Any suitable maltodextrin may be used in accordance with the present invention. Preferably, the maltodextrin is water soluble and has a degree of polymerization of less than 10. For example, suitable maltodextrins, such as Maltrin M040, Maltrin M100, or Maltrin M150 may be purchased commercially from Grain Processing Corporation.

The process includes mixing from about 75% to about 90% by weight of the modified chloride salt product with from about 10% to about 25% by weight of the carrier to form a carrier modified chloride salt solution. Preferably, the process includes mixing about 87.5% by weight of the modified chloride salt product with about 12.5% by weight of the maltodextrin to form a carrier modified chloride salt solution. Generally the weight percentages will vary based on the carbon length of the carrier and the amount of chloride salt product used to make the solution. Typically, the modified chloride salt product is mixed with the carrier in a suitable vessel that includes an agitation means to avoid the formation of lumps in the solution. The solution is then heated to at least about 185° F. to ensure that the mixture is smooth, fairly thick and pourable. Alternatively, the solution may then be mixed with an additional amount of water to ensure that the solution is less viscous for ease of the drying process. For example, the carrier modified chloride salt solution may be mixed with from about 0% to about 40% by additional weight water prior to drying the solution.

The modified chloride salt solution is then dried to form a powdered or granular carrier modified chloride salt. Generally, any process known in the art that produces a powdered or granular carrier modified chloride salt may be used. A preferred process is spray drying. A spray drier operates by atomizing a stream of the modified chloride salt solution using hot air in a drying chamber. The atomization breaks the solution into small droplets, thereby increasing the surface area and thus the rate of evaporation. The small size of the droplets result in a relatively large surface area that dries quickly. The particles are removed from the drier typically within 30 seconds. The temperatures of the particles during the drying process can range from wet-bulb temperature of the inlet air to above 212° F. (100° C.) as they exit in the dry state. The operating conditions may be selected according to the drying characteristics of the product and the desired granule or powder size. Typically, any spray drier design may be used in accordance with the present invention. For example the drier may be designed to have co-current, counter-current, or mixed air flow. In a co-current system the drying air and particles move through the drying chamber in the same direction. In a counter-current system the drying air and the particles move through the drying chamber in opposite directions. Finally, in a mixed air flow system the particles experience both co-current and counter-current phases.

Alternatively, the modified chloride salt solution may be used in a liquid form. In this alternative, the modified chloride salt solution is blended or mixed with a dry mixture of sodium chloride to form a salt composition solution.

The second step of the process includes blending or mixing the powdered or granular carrier modified chloride salt with sodium chloride and grinding the dry mixture to form a salt composition. The present invention ensures that the sodium chloride remains in its natural, crystalline form, rather than reacting with the modified chloride salt. In addition, the process is cost effective, as only the carrier modified chloride salt solution needs to be dried. The NaCl does not need to be dried, it is only blended and ground, in its natural form, with the powdered or granular carrier modified chloride salt.

The powdered or granular carrier modified chloride salt is mixed with sodium chloride in an approximate ratio of 1/3 carrier modified chloride salt to 2/3 sodium chloride by weight in the second step. The mixing or blending of the powdered or granular carrier modified chloride salt and sodium chloride may be conducted in any suitable vessel. After the powdered or granular carrier modified chloride salt and the sodium chloride are mixed, the dry mixture may be ground or milled to the salt composition's desired particle size. Similarly to the mixing vessel, any suitable grinder or mill may be used in accordance with this invention. Alternatively, if larger particle sizes are desired the salt composition may be agglomerated or crystallized at lower temperatures.

The salt composition may have any desired particle size. The salt composition typically has a particle size larger than about 100 mesh, U.S. standard sieve size. Preferably, the salt composition has a particle size of between about 35 and about 60 mesh. It should be recognized that the particle size of the composition is selected to meet the particular end use application. "Pretzel grade" salt generally has a particle size that passes through a 35 mesh sieve, whereas "shaker grade" salt has a particle size that passes through between a 35 and a 60 mesh sieve. "Popcorn grade" salt has a particle size that passes through a 60 mesh sieve. Once ground, the salt composition should have less than about 10% of all granules, which are finer than 100 mesh. All mesh sizes are by U.S. standard sieve size.

Additionally, silicon dioxide may be included in the salt composition to prevent caking. In one aspect of the present invention from about 0.1% to about 2% by weight of silicon dioxide may be added to the composition, preferably about 1% by weight of silicon dioxide.

The resultant salt composition includes from about 10% to about 90% by weight sodium chloride, from about 2.5% to about 80% by weight chloride salt, from about 1% to about 75% by weight carrier, and from about 0.1% to about 5% by weight modifier. Preferably, the resultant salt composition includes about 50% by weight sodium chloride, about 40% by weight potassium chloride, about 8% by weight maltodextrin, and about 1% by weight citric acid.

The salt composition of the present invention includes from about 10% to about 30% by weight sodium and from about 5% to about 15% by weight potassium.

Alternatively, other additives may be included in the carrier modified chloride salt product. Suitable additives include, for example, antioxidants, to reduce the rancidity of the salted products when cooked, phosphates, to tenderize the salted food product, and/or colorants, to give the salt composition a distinct color. Suitable antioxidants include rosemary extract, butylated hydroxytoluene, butylated hydroxyanisole, and tocopherols, among others. Suitable phosphates include monosodium phosphate, tetrasodium pyrophosphate, sodium hexametaphosphate, monopotassium phosphate, tetrapotassium pyrophosphate, disodium phosphate, sodium tripolyphosphate, sodium acid pyrophosphate, dipotassium phosphate, and potassium tripolyphosphate. Suitable natural colorants include caramel color, turmeric, annatto, beta-carotene, paprika oleoresin, red cabbage juice, beet juice, grape skin extract, and carmine, among others. Alternatively, the antioxidant used may also act as a colorant. Preferably, the modified chloride salt product includes rosemary extract as an antioxidant. Rosemary extract may be included at a dosage of from about 100 ppm to about 1000 ppm by weight of the modified chloride salt product.

The salt composition of the present invention may be used as a substitute for salt, i.e. sodium chloride. Similarly, the salt composition of the present invention may be used in addition to or as a blend to salt. The salt composition of the present invention may be used in a variety of applications as table salt, inclusion in snack foods, baked goods, to season meats and poultries, and for other food items that have included salt. Preferably the salt composition of the present invention is used to injection marinate meats and poultries as the composition has a low viscosity and can be processed through a meat injection needle.

The following examples are simply intended to further illustrate and explain the present invention. The invention, therefore, should not be limited to any of the details in these examples.

EXAMPLES

Example 1

Spray Drying to Make Powdered Modified Potassium Chloride 30.7 lbs of water were heated in a steam kettle with a swept surface agitator to a temperature of 195° F. 12.5 lbs of potassium chloride (KCl) were then added into the hot water and mixed for 5 minutes. After that, 0.5 lbs of citric acid were added to the hot water and mixed for an additional 5 minutes until the KCl was completely dissolved.

After mixing in the citric acid, 0.025 lbs of rosemary extract were added to the mixture. Finally, 6.25 lbs of maltodextrin (Maltrin 040 purchased commercially from Grain Processing Corporation) were added to the mixture with constant agitation to avoid lumping. The final mixture of the carrier modified potassium chloride solution was heated to a minimum temperature of 185° F. The carrier modified potassium chloride solution was smooth, fairly thick, and easily pourable.

The carrier modified potassium chloride solution was then spray dried to form a powdered carrier modified potassium chloride. The liquid mixture's temperature was 175° F. The pump speed was 5 hp. The furnace temperature was between 400° F. and 410° F. The air inlet temperature was 286° F. and the air outlet temperature was 184° F. The vacuum on the drying chamber was 0.10 in/water.

The dried carrier modified potassium chloride was white in color, free flowing, and a very fine powder.

Example 2

Making Salt Composition

The powdered carrier modified potassium chloride from example 1 was mixed in a ratio of 1/3 powdered carrier modified potassium chloride to 2/3 by weight natural, unmodified sodium chloride and 1% by weight silicon dioxide. The salt composition was then mixed and ground in an Udy Cyclone Mill through a 1 mm screen (UDY Corporation, 201 Rome Court, Fort Collins, Colo. 80524).

The invention illustratively disclosed herein suitably may be practiced in the absence of any element, which is not specifically disclosed herein. It is apparent to those skilled in the art, however, that many changes, variations, modifications, other uses, and applications to the method are possible, and also changes, variations, modifications, other uses, and applications which do not depart from the spirit and scope of the invention are deemed to be covered by the invention, which is limited only by the claims which follow.

What is claimed is:

1. A method of making a salt composition, consisting of:
    a. contacting from about 15% to about 30% by weight potassium chloride salt with an amount from about 0.1% to 3% by weight food grade acidulant in an aqueous solution at a temperature between about 150° F. and about 200° F. to form a liquid modified potassium chloride salt product, wherein the aqueous solution includes the addition of from about 60% to 80% water;
    b. mixing the modified liquid potassium chloride salt product with an amount from about 10% to 25% by weight carrier to form a liquid carrier modified potassium chloride salt solution, wherein the carrier is a starch molecule; and
    drying the liquid carrier modified potassium chloride salt solution to form a granular carrier modified chloride salt.

2. The method of claim 1, wherein the food grade acidulant is selected from the group consisting of citric acid, malic acid, tartaric acid, fumaric acid, lactic acid, acetic acid, and benzoic acid.

3. The method of claim 2, wherein the food grade acidulant is citric acid.

4. The method of claim 1, wherein the drying step includes spray drying the mixture.

5. The method of claim 1, wherein the temperature is about 195° F.

6. The method of claim 1, wherein the starch molecule is a short chained starch molecule.

7. A method of making a salt composition, consisting of:
    a. contacting from about 15% to about 30% by weight potassium chloride salt with an amount from about 0.1% to 3% by weight food grade acidulant in an aqueous solution at a temperature between about 150° F. and about 200° F. to form a liquid modified chloride salt product, wherein the aqueous solution includes the addition of from about 60% to 80% water;
    b. mixing the liquid modified potassium chloride salt product with an amount from about 10% to 25% by weight carrier, wherein the carrier is a starch molecule, to form a liquid carrier modified potassium chloride salt solution;
    c. drying the liquid carrier modified potassium chloride salt solution to form a granular carrier modified potassium chloride salt; and
    d. blending the powdered or granular carrier modified potassium chloride salt with sodium chloride to form a salt composition.

8. The method of claim 7, wherein the food grade acidulant is citric acid.

9. The method of claim 7, wherein the temperature is about 195° F.

10. The method of claim 1, wherein the aqueous solution contains about 60% to 80% water.

11. The method of claim 7, wherein the aqueous solution contains about 60% to 80% water.

12. A method of making a salt composition, consisting of:
    a. contacting from about 15% to about 30% by weight potassium chloride salt with from about 0.1% to 3% by weight citric acid in an aqueous solution at a temperature between about 150° F. and about 200° F. in a steam kettle to form a liquid modified chloride salt product, wherein the aqueous solution includes the addition of from about 60% to 80% water;
    b. mixing the liquid modified potassium chloride salt product with an amount from about 10% to 25% by weight starch molecule, to form a liquid carrier modified potassium chloride salt solution; and
    c. drying the liquid carrier modified potassium chloride salt solution to form homogenous uniform particles of the carrier modified potassium chloride salt.

13. The method of claim 6, wherein the short chained starch molecule is maltodextrin.

14. The method of claim 7, wherein the starch molecule is a short chained starch molecule.

15. The method of claim 14, wherein the short chained starch molecule is maltodextrin.

16. The method of claim 12, wherein the starch molecule is a short chained starch molecule.

17. The method of claim 16, wherein the short chained starch molecule is maltodextrin.

* * * * *